United States Patent
Dzung et al.

(10) Patent No.: US 10,164,762 B2
(45) Date of Patent: Dec. 25, 2018

(54) METHOD, SYSTEM AND DEVICE FOR CLOCK SYNCHRONIZATION OVER TIME-VARYING AND LOSSY NETWORKS

(71) Applicant: ABB Schweiz AG, Baden (CH)

(72) Inventors: Dacfey Dzung, Wettingen (CH); Trond Loekstad, Nesoddtangen (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/797,493

(22) Filed: Oct. 30, 2017

(65) Prior Publication Data

US 2018/0048457 A1  Feb. 15, 2018

Related U.S. Application Data

(63) Continuation of application No. PCT/EP2016/054217, filed on Feb. 29, 2016.

(30) Foreign Application Priority Data

Apr. 29, 2015  (EP) .................................... 15165756

(51) Int. Cl.
*H04L 7/00* (2006.01)
*H04J 3/06* (2006.01)
*H04L 29/06* (2006.01)

(52) U.S. Cl.
CPC .......... *H04L 7/0037* (2013.01); *H04J 3/0667* (2013.01); *H04L 67/42* (2013.01)

(58) Field of Classification Search
CPC ..... G06F 1/04; G06F 1/10; G06F 1/14; G06F 9/455; G06F 15/16; H04J 1/16; H04J 3/06; H04J 3/0661; H04J 3/0667; H04J 3/07; H04J 11/00; H04L 7/00; H04L 7/0037; H04L 29/06; H04L 7/08; H04W 56/00

USPC ........ 370/252, 338, 503; 375/354, 356, 358; 702/176; 703/21; 713/500, 503

See application file for complete search history.

(56) References Cited

U.S. PATENT DOCUMENTS

| | | | |
|---|---|---|---|
| 7,860,205 B1 * | 12/2010 | Aweya | H03L 7/093 370/497 |
| 8,730,868 B2 * | 5/2014 | Yamada | H04J 3/0661 370/324 |
| 8,954,609 B1 * | 2/2015 | Holleman | H04J 3/0667 709/203 |
| 2009/0147806 A1 * | 6/2009 | Brueckheimer | H04J 3/0667 370/503 |

(Continued)

FOREIGN PATENT DOCUMENTS

WO  2015049480 A1  4/2015

OTHER PUBLICATIONS

European Patent Office, International Search Report & Written Opinion issued in corresponding Application No. PCT/EP2016/054217, dated Apr. 28, 2016, 12 pages.

(Continued)

*Primary Examiner* — Shawkat M Ali
(74) *Attorney, Agent, or Firm* — J. Bruce Schelkopf; Taft Stettinius & Hollister LLP

(57) ABSTRACT

The present invention is directed towards a method, a system, and a device which allow an improved synchronization of a system-wide timing information over a network. Hence, slave clocks can be synchronized to a high quality clock, such as a master clock.

16 Claims, 5 Drawing Sheets

(56) References Cited

U.S. PATENT DOCUMENTS

| | | | |
|---|---|---|---|
| 2010/0020909 A1* | 1/2010 | Jung | H04J 3/0667 375/371 |
| 2012/0109620 A1* | 5/2012 | Gaikwad | G05B 13/048 703/21 |
| 2012/0269204 A1 | 10/2012 | Zempetti | |
| 2013/0182806 A1* | 7/2013 | Obradovic | H04J 3/0673 375/356 |
| 2014/0068315 A1 | 3/2014 | Aweya et al. | |

OTHER PUBLICATIONS

European Patent Office, Extended Search Report issued in corresponding Application No. 1565756.6, dated Nov. 2, 2016, 6 pages.

* cited by examiner

METHOD, SYSTEM AND DEVICE FOR CLOCK SYNCHRONIZATION OVER TIME-VARYING AND LOSSY NETWORKS

The present invention is directed towards a method which allows a synchronization of client clocks providing the master time to several client clocks. A server machine runs a reference clock and forms the basis for a system-wide time, which therefore has to be distributed over a network. The present invention provides an improved mechanism which allows a coupling of several client machines to the specific server machine with high synchronization accuracy. The present invention is also directed towards a system providing a client clock and a server clock, which are synchronized. Furthermore, a client is suggested which can be run in several instances distributed over a network, which is then synchronized with this server time.

For many applications, clocks at distributed locations must be synchronized. This can be done by exchanging time messages over a communication network connecting the clocks. However, time-varying behaviour of the communication network affects the synchronization performance. This invention concerns methods to mitigate the effects of unreliable communication networks on synchronization performance.

One of the known methods is the Network Time Protocol NTP, which is a networking protocol for synchronizing clocks among computer systems over packet-switched, variable-latency data networks. The basic idea of NTP is to provide time stamps for sending and receiving operations in a network and synchronizing clocks as a function of network delay times.

Many methods have been described in the literature to deal with the effect of unreliable transmission on synchronization performance. Most simply, the raw clock offset measurements, denoted as $\theta_k$, can be averaged or filtered by some low-pass. To reduce the effect of delay outliers, the state of the art clips the input to the filter to some empirical $3\sigma$ level. For optimum filtering, a known method uses the mathematical clock model to derive a Kalman Filter to estimate the server clock state (phase and frequency) from $\theta_k$. The Kalman filter is optimum for random Gaussian errors on $\theta_k$, but for the case of interest with delay outliers and hence occasional large spikes in $\theta_k$, the Kalman Filter is known to be too sensitive. There is however a vast literature on Robust Kalman Filters which can be applied here: In a known method, if measurements are lost due to network failure, the recursive updating of the state estimate is simply suppressed. In a further known method, the innovation vector in the update step is clipped to some level b, to be chosen in some minimax sense. A known method combines these concepts: if the (norm of the) innovation is larger than a threshold, i.e. an outlier is detected, the updating of the state estimate is suppressed.

The above methods modify recursive filtering to deal with outliers. A known method indicates that non-recursive (batch) procedures may perform better in the presence of outliers. Specifically for synchronization, batch line fitting methods have been described. It is assumed that the clock server periodically broadcasts time messages and considers consecutive differences between client and server time stamps. Delay outliers are then always positive, thus simplifying outlier detection and line fitting. NTP uses the latest eight measurements in an ad-hoc way to detect outliers.

US 2014/068315 A1 relates to methods and devices for clock offset in skew estimation wherein the slave clock employs an independent free-running clock and recursive estimation technique to estimate the clock offset and clock skew between slave and master clocks.

US 2012/0269204 A1 relates to a method for generating a timing correction in timing transfer systems evaluating the weighted average of short-term, medium-term and long-term measurements of local clock off-set.

WO 2015/049480 A1 relates to methods and devices for time and frequency synchronization.

The present invention is an application of batch processing to synchronization, combined with concepts from recursive processing to deal with measurement outliers. A clock server has a high quality clock (master clock) which provides the reference time. A communication link connects the clock server to a client clock (slave clock). The task is to synchronize the client clock to the server clock, i.e. to control the client clock such that the client time $x_C(t)$ closely tracks the server time $x_S(t)$. In the well-known network-based synchronization method (also known as "echo" or "ping-pong" method), client clock offset $\theta$ is measured by exchanging timing messages between the server and client clock, and time-stamping the message transmission and reception times $T_1$ to $T_4$. This is shown in FIG. 1A. If the frequency error of the client clock is negligible, then the instantaneous clock offset is $$\theta = \frac{T_1 - T_2}{2} + \frac{T_4 - T_3}{2} + \frac{\Delta d}{2},$$

where $\Delta d = d_{CS} - d_{SC}$ is the asymmetry of the message delays from client to server $d_{CS}$ and server to client $d_{SC}$. In practice, these delays are unknown. However it is usually assumed that the bi-directional links are symmetric, i.e. $\Delta d = 0$, hence $$\theta_k = \frac{T_1 - T_2}{2} + \frac{T_4 - T_3}{2}$$

is the instantaneous measured offset of the client clock (at time $t_k = T_1$). This formula is well-known and is the basis for the standardized synchronization protocols NTP [RFC 5905] and PTP [IEEE 1588].

The problem to be solved is to mitigate these effects by appropriate processing of the sequence of measurements $\{\theta_k\}$, and thus to improve performance of network-based synchronization. Hence, it is the object of the present invention to provide an improved synchronization method in a network.

The problem is solved by a method for network-based synchronization of a client clock to a server clock holding features according to claim 1.

Accordingly, a method for synchronization of a client clock to a server clock over a network is provided comprising the steps of determining on the network at least one clock offset, preferably a plurality of clock offsets, by exchanging time synchronization messages between the client and the server clock, wherein the clock offsets are only considered within a provided time horizon. The suggested method furthermore comprises weighting the determined clock offsets by their measurement accuracy, in order to obtain a weighted clock offset that may include an estimated clock phase and clock frequency. The weighted clock offset can be the output of a filter, e.g. using Kalman filter to produce estimated clock phase and clock frequency from a sequence of the determined clock offsets, or preferably the weighted clock offset can be the clock phase and the clock frequency obtained by moving horizon line fitting using equation (3) as described later. After weighting of the clock offsets, the client clock can be adjusted as a function of the weighted clock offset such that the client clock is synchronized to the server clock. As the synchronization is performed over a network, the suggested subject-matter of the independent claims can be accomplished network-based.

The person skilled in the art appreciates that several approaches for determining the at least one clock offset can be applied such as calculation, estimation, measuring or reading-out of such values.

Although a client-server-architecture is the typical application scenario of the present invention, the person skilled in the art appreciates that the involved actors can as well behave in a peer-to-peer fashion. Hence, in the following, the server machine as well as the client machine may both be provided by independent peers, which again can be implemented as hardware resources or software components.

Network-based synchronization comprises the exchanging of timing messages such as timing request messages and/or timing response messages, also known as sync and delay measurement messages. The person skilled in the art appreciates that the timing messages may comprise delay measurements and therefore delay measurement messages can be exchanged. Furthermore, the timing messages to be exchanged can be referred to as synchronization messages or time synchronization messages used in NTP, PTP and other similar protocols. According to IEEE 1588, the PTP message is the general term for synchronization messages, where the most relevant are: Sync, Delay_Req, Follow_Up, Delay_Resp. Regarding the time synchronization according to IEEE 1588, Sync is sent at t1 and Delay_Req at t3.

For each sending operation of such a timing message and for each receiving operation, a time stamp is provided. Hence, it is possible to measure delay times of a network, which means the transmission time between sending and receiving a message. This procedure can be performed repeatedly such that several measurements are taken and therefore the latency time of a network can be evaluated more accurately. It may also be of advantage to send messages according to different properties over the network. For instance, one may measure transmission times of very large messages and compare those evaluation results with transmission times of a variety of very short messages. Hence, the overall network behaviour can be determined.

As only the current network behaviour is of relevance, a time horizon can be determined. Hence, only a specific number of messages or a specific time span or time interval is considered for evaluating the network parameters. As this procedure can be performed several times, at least one clock offset is determined, which is determined as a function of at least one transmission time of at least one message.

Once the at least one clock offset is determined or measured, it is respectively weighted. This can be performed by selecting a provided weighting factor, such as the inverse of the measurement variance.

Once the network behaviour is properly detected, the client clock can be adjusted as a function of the weighted at least one clock offset. This may be performed by the addition of delay times to the client timing.

In the following, further information is provided regarding the technical background of the present invention. The person skilled in the art appreciates that the following mathematical background and aspects of the present invention only provide aspects of the technical teaching and do not limit the scope of the subject-matter. Especially, it may be of advantage to amend the provided technical teaching by additional factors or parameters. While the provided mathematical models are clearly defined by mathematical formulae, the person skilled in the art appreciates that those formulae may as well be enhanced or adapted towards a specific application scenario. Hence, only the basic functionality is provided. Therefore, basic aspects of the present invention are described in the following such as:

Aspect A: Clock Model and Kalman Filter for Synchronization

Aspect B: Moving Horizon Estimation for Synchronization

Aspect C: Simplification of Moving Horizon Estimation to Moving Horizon Line Fitting Aspect A: Clock Model and Kalman Filter for Synchronization Clock Model: In the simplest clock model, time deviation $x(t)$ increases linearly in time, i.e.

$$x(t) = y_0 t + x_0 \quad \text{(A.1)},$$

where $y_0$ is the constant fractional frequency offset. Hence the clock phase $x(t_k)$ at discrete times $t_k$ satisfies the recursion $$x(t_{k+1}) = x(t_k) + y_0(t_{k+1} - t_k) \quad \text{(A.2)}.$$

More generally, models of imperfect clocks describe clock phase x and frequency deviation y by stochastic processes X and Y, hence $$X_{k+1} = X_k + Y_k(t_{k+1} - t_k) \quad \text{(A.3)}.$$

It can be assumed that the clock phase $X(t)$ and frequency deviation $Y(t)$ can be described by independent Brownian motions with intensities $\sigma_1^2$ of (in units of [s]) and $\sigma_2^2$ (in units of [1/s]), respectively, i.e.

$$dX(t) = (Y(t) + y_0)dt + \sigma_1 dW_1(t) \quad \text{(A.4)},$$

$$dY(t) = a\, dt + \sigma_2 dW_2(t) \quad \text{(A.5)}.$$

If non-constant frequency drift is included, the model includes a third Brownian motion $dW_3(t)$ and becomes three-dimensional.

By integration, a time-discrete linear stochastic clock model is derived: The clock state vector is two-dimensional, $X_k = [X_k\ Y_k]'$, and obeys the recursion $$\begin{bmatrix} X_{k+1} \\ Y_{k+1} \end{bmatrix} = \underbrace{\begin{bmatrix} 1 & t_{k+1} - t_k \\ 0 & 1 \end{bmatrix}}_{F_k} \underbrace{\begin{bmatrix} X_k \\ Y_k \end{bmatrix}}_{x_k} + \underbrace{\begin{bmatrix} W_{1,k} \\ W_{2,k} \end{bmatrix}}_{w_k} \quad \text{(A.6)}$$

$$x_{k+1} = F_k x_k + w_k, \quad \text{(A.7)}$$

where $W_k$ are i.i.N(0, Q) with $$Q \stackrel{def}{=} E[w_k w_k'] = \begin{bmatrix} \sigma_1^2(t_{k+1} - t_k) + \sigma_2^2 \frac{(t_{k+1} - t_k)^3}{3} & \sigma_2^2 \frac{(t_{k+1} - t_k)^2}{2} \\ \sigma_2^2 \frac{(t_{k+1} - t_k)^2}{2} & \sigma_2^2(t_{k+1} - t_k) \end{bmatrix}. \quad \text{(A.8)}$$

The clock parameters $\sigma_1^2$ and $\sigma_2^2$ are obtained from measurements (data sheets) of the oscillator on which the clock is based, see Note 1 below.

Clock measurement for synchronization: At the client clock side, the server clock phase $X_k$ is measured using the two-way echo measurement involving exchange of time-stamps $T_1$ to $T_4$. The resulting offset measurement $\theta_k$ corresponds directly to the phase $X_k$. Measurement errors are due to jitter in the time stamping and Packet Delay Variation (PDV) and delay asymmetries $\Delta d$ of the message transmissions. In the model, these errors are all subsumed in the measurement noise $v_k$. The measurement equation of the server clock state $x_k$ is thus $$\underbrace{[\theta_k]}_{z_k} = \underbrace{[1 \; 0]}_{H'} \underbrace{\begin{bmatrix} X_k \\ Y_k \end{bmatrix}}_{x_k} + \underbrace{[v_k]}_{v_k}, \quad (A.9)$$

$$z_k = H'x_k + v_k, \quad (A.10)$$

where the measurement $z_k$ is the scalar $\theta_k$ and $v_k$ is the measurement noise with variance $$R_k \stackrel{def}{=} E(v_k v_k') = \sigma_\theta^2 \quad (A.11)$$

(in units of $[s^2]$). Occasional large errors in the measurements $\theta_k$, e.g. due to message loss or network congestion, are modelled as large $\sigma_\theta^2 \to \infty$ leading to "additive outliers" in the measurements $z_k$, i.e. $R_k \to \infty$.

Note 1: The values of the clock parameters $\sigma_1^2$ and $\sigma_2^2$ can be obtained from off-line measurements of the Allan variance $\sigma_y^2(\tau)$, $$\sigma_y^2(\tau) \stackrel{def}{=} \frac{1}{2} \langle (\overline{Y}_{i+1} - \overline{Y}_i)^2 \rangle, \text{ where} \quad (A.12)$$

$$\overline{Y}_i = \frac{1}{\tau} \int_{i\tau}^{(i+1)\tau} y(s)ds = \frac{x((i+1)\tau) - x(i\tau)}{\tau},$$

y(t) and x(t) are the measured instantaneous frequency and clock deviation, and $\tau$ is the measurement interval. Using the relationship derived in Cristina Zucca and Patrizia Tavella, "The Clock Model and Its Relationship with the Allan and Related Variances," IEEE Transactions on ultrasonics, ferroelectrics, and frequency control, vol. 52, no. 2, February 2005, pp. 289-296, $$\sigma_y^2(\tau) = \frac{\sigma_1^2}{\tau} + \frac{\sigma_2^2 \tau}{3}, \quad (A.13)$$

(valid for a=0), $\sigma_1^2$ and $\sigma_2^2$ are read off from a plot of the measured Allan variance $\sigma_y^2(\cdot)$: The value of $\sigma_y^2(\tau)$ at some small $\tau$ gives $\sigma_1^2$, while the value at a large $\tau$ gives $\sigma_2^2$.

Note 2: Typical values for PC clocks are $\sigma_1^2 = 10^{-12}$ s and $\sigma_2^2 = 10^{-16}$ s$^{-1}$. After a time interval T=1 s, this results in a clock phase variance of $\sigma_1^2 T = 10^{-12}$ s$^2$, i.e. a jitter of $10^{-6}$ s=1 μs. The fractional frequency variance is $\sigma_2^2 t = 10^{-16}$, i.e a standard deviation of $10^{-8} = 0.01$ ppm or 0.01 μs/s.

Kalman Filter: Given the clock offset measurements $z_k$, k=1, 2, . . . , the Kalman filter produces minimum mean square error estimates $\hat{x}_k$ of the state $x_{k+1}$, i.e. of both the clock phase (time offset) and frequency offset (see Note 3 below). For the above model, the Kalman filter recursion is $$K_k = F_k P_{k-1} H(H'P_{k-1}H + R_k)^{-1} \quad (A.14)$$

$$\hat{x}_k = F_k \hat{x}_{k-1} + K_k(z_k - H'\hat{x}_{k-1}) \quad (A.15)$$

-continued $$P_k = F_k[P_{k-1} - P_{k-1}H(H'P_{k-1}H + R_k)^{-1}H'P_{k-1}]F_k' + Q = \quad (A.16)$$
$$= (F_k - K_k H')P_{k-1}(F_k - K_k H') + K_k R_k K_k' + Q,$$

with initializations $$\hat{x}_0 = E[x_0] \quad (A.17)$$

$$P_0 = E[(x_0 - \hat{x}_0)(x_0 - \hat{x}_0)'] \quad (A.18).$$

The Kalman Filter is mean-square optimal if the measurement noise $v_k$ is uncorrelated with known finite variance $R_k$. However, any measurement outliers will lead to large errors in the estimates.

To make Kalman filters more robust, typically outliers are detected by comparing the "innovation" signal ($Z_k - H'\hat{x}_{k-1}$ in (A.15) against some threshold. If the threshold is exceeded, an outlier is declared, i.e. the corresponding measurement variance is set to $R_k \to \infty$, causing $K_k \to 0$, thus the measurement $z_k$ ($= \theta_k$) is ignored and the error covariance $P_k$ increases by Q. The choice of the threshold is critical and may require some ad-hoc tuning.

Client clock control: $\hat{x}_k$ in (A.15) is the server clock state $x_{k+1}$ at time $t_{k+1}$, predicted at time $t_k$ based on measurements up to $z_k$, i.e. $\hat{x}_k = \hat{x}_{k+1|k}$. The estimate of $x_k$ is $\hat{x}_{k|k} = F_k^{-1} \hat{X}_{k+1|k}$, i.e. $\hat{X}_{k|k} = \hat{X}_{k+1|k} - \hat{Y}_{k|k}(t_{k+1} - t_k)$ and $\hat{Y}_{k|k} = \hat{Y}_{k+1|k}$. For the synchronization of the client clock, these values are to be applied as set points to adjust the client clock at time $t_k$.

Aspect B: Moving Horizon Estimation (MHE) for Synchronization

Given the measurements $z_1, \ldots z_N$ over the horizon k= 1, . . . N, the least squares state estimates $\hat{x}_1 \ldots \hat{x}_N$ minimize $$J(x_1, \ldots x_N) = \Sigma_{k=1}^N (z_k - H'x_k)'R_k^{-1}(z_k - H'x_k) + w_k' Q^{-1} w_k \quad (B.1),$$

subject to that the sequence $\{x_k\}$ is the solution of the model (A.7) when driven by the sequence $\{w_k\}$. Define $[x_1 \ldots x_N]'$ and $W = [x_1 \; w_1 \ldots w_{N-1}]'$ (vectors of dimension 2N), then J(X) can be written as $$J(X) = \text{const} + X'\mathbb{R}X + 2f'X + W'\mathbb{Q}W \quad (B.2)$$

where $$\mathbb{R} = \begin{bmatrix} \ddots & 0 & 0 \\ 0 & HR_k^{-1}H' & 0 \\ 0 & 0 & \ddots \end{bmatrix}, f = -\begin{bmatrix} \vdots \\ HR_k^{-1}z_k \\ \vdots \end{bmatrix}, \quad (B.3)$$

$$\mathbb{Q} = \begin{bmatrix} 0 & 0 & 0 \\ 0 & Q^{-1} & \ldots \\ 0 & \vdots & \ddots \end{bmatrix}.$$

The least square state estimate is found by solving the Quadratic Programming (QP) problem $$\min_{X,W} \{X'\mathbb{R}X + 2f'X + W'\mathbb{Q}W\} \quad (B.4)$$

where X, W are subject to the model state equation (A.7).

Note 3: Since $H' = [1 \; 0]$, the 2×2 sub-matrices $HR_k^{-1}H'$ in $\mathbb{R}$, and hence $\mathbb{R}$, are singular (positive semidefinite, rather than positive definite). Minimization of $X'\mathbb{R}X + 2f'X$ may thus become an ill-conditioned problem. However, the additional term $W'\mathbb{Q}W$ with non-singular positive definite $\mathbb{Q}$ stabilizes the problem (B.10).

The following steps formulate the QP problem in terms of transformed optimization variables W such that the model state equations are satisfied. Solving the recursion (A.7) gives $$x_k = (\pi_{i=1}^{k-1} F_i) x_1 + \Sigma_{i=1}^{k-1} (\pi_{j=i+1}^{k-1} F_j) w_i \quad (B.5).$$

Define $$\Phi_{ki} \overset{def}{=} \prod_{j=i}^{k-1} F_j = \begin{bmatrix} 1 & t_k - t_i \\ 0 & 1 \end{bmatrix} \quad (B.6)$$

where the second equality follows from the definition of $F_k$. Then $$x_k = \Phi_{k1} x_1 + \Sigma_{i=1}^{k-1} \Phi_{k,i+1} w_i \quad (B.7),$$

or, in explicit form, $$\begin{bmatrix} X_k \\ Y_k \end{bmatrix} = \begin{bmatrix} X_1 + Y_1(t_k - t_1) \\ Y_1 \end{bmatrix} + \sum_{i=1}^{k-1} \begin{bmatrix} W_{1,i} + W_{2,i}(t_k - t_{i+1}) \\ W_{2,i} \end{bmatrix}. \quad (B.8)$$

In terms of the optimization variable $$W = [x_1 w_1 \ldots w_{N-1}]' = [X_1 Y_1 W_{1,1} W_{2,1} \ldots W_{1,N-1} W_{2,N-1}]',$$

X thus becomes $$X = \underbrace{\begin{bmatrix} \Phi_{11} & 0 & 0 & \ldots \\ \Phi_{21} & \Phi_{22} & 0 & \ldots \\ \Phi_{31} & \Phi_{32} & \Phi_{33} & \ldots \\ \vdots & \vdots & \vdots & \ddots \end{bmatrix}}_{\Sigma} \underbrace{\begin{bmatrix} X_1 \\ W_1 \\ W_2 \\ \vdots \end{bmatrix}}_{W} = \Sigma W. \quad (B.9)$$

The Quadratic Programming problem then becomes $$\min_W \{W'(\Sigma' \mathbb{R} \Sigma + Q) W + 2(f' \Sigma) W\} \quad (B.10)$$

with bound constraints (see below)

$$|W| \leq q \quad (B.11).$$

The solution W is obtained by some standard numerical QP algorithm. The estimated state trajectory $\hat{x}_1 \ldots \hat{x}_N$ is recovered using $X = \Sigma W$. In practice, only the most recent estimate $\hat{x}_N$ is of interest. It is applied to the control of the client clock at time k=N. The estimation horizon k=1, ... N is then moved one or T steps forward.

Constrained estimation due to measurement outliers: Consider the clock phase change $X_{k+1} - X_k$. Its component which is not due to the frequency deviation $Y_k$ is $W_{1,k}$. As $W_{1,k} \sim N(0, q_{11})$, then with high probability, $$|W_{1,k}| \leq m\sqrt{q_{11}} = m\sqrt{\sigma_1^2(t_{k+1} - t_k) + \sigma_2^2 \frac{(t_{k+1} - t_k)^3}{3}} \quad (B.12)$$

(using (A.8)), where m is the ratio of the maximum over the standard deviation, e.g. m=2.—The frequency deviation $Y_k$ is modelled as a random walk with i.i.d. increments $W_{2,k} \sim N(0, q_{22})$. With high probability $$|Y_{k+1} - Y_k| = |W_{2,k}| \leq m\sqrt{q_{22}} = m\sqrt{\sigma_2^2(t_{k+1} - t_k)} \quad (B.13)$$

(see (A.8), i.e. the components of W are bounded. Estimates corresponding to large $W_{1,k}$, $W_{2,k}$, i.e. with large jumps, are likely artifacts caused by large errors and outliers in the measurements, and should thus be prevented. This is achieved by forcing the estimates to be constrained in $|W| \leq q$.

Outlier detection: In Kalman Filters, outliers are typically detected by observing the "innovation" signal. Using MHE or MHLF described in Aspect C below, no innovation signal is available, and some alternative outlier detection method is required. Here, a simple method is proposed based on observing successive measurements $\theta_k$: From (A.3), $$\theta_k - \theta_{k-1} = Y_{k-1}(t_k - t_{k-1}) + v_k - v_{k-1} \quad (B.14).$$

Unusually large measurement errors $v_k$ are considered as outliers, hence $\theta_k$ is classified as an outlier if $$|\theta_k - \theta_{k-1} - \hat{Y}_{k-1}(t_k - t_{k-1})| > m\sigma_\theta \quad (B.15),$$

where m is the ratio of the threshold to the steady state measurement deviation $\sigma_\theta$. When outliers are declared, then the corresponding measurement value $z_k (= \theta_k)$ is suppressed by setting its inverse weight $R_k$ to a large value, e.g. $R_k = 1000\sigma_\theta^2$, in (A.14), (B.1), or (C.3).

Aspect C: Simplification of MHE to Moving Horizon Line Fitting (MHLF)

Assuming W≡0, it follows from (B.8) that the past states $x_k$, at times $t_k$, are related to the current state $x_k = [X_k \, Y_k]'$ at time $t_k$ by $$x_{k'} = \begin{bmatrix} X_{k'} \\ Y_{k'} \end{bmatrix} = \begin{bmatrix} X_k - Y_k(t_k - t_{k'}) \\ Y_k \end{bmatrix}. \quad (C.1)$$

The squared error (B.1) over the moving horizon of the most recent N measurements at $t_{k-N+1}, \ldots t_k$ becomes $$J(x_{k-N+1}, \ldots x_k) = \sum_{k'=k-N+1}^{k} (z_{k'} - H' x_{k'})' R_{k'}^{-1} (z_{k'} - H' x_{k'}) = \quad (C.2)$$

$$\sum_{k'=k-N+1}^{k} \frac{1}{R_{k'}} (z_{k'} - X_k + Y_k(t_k - t_{k'}))^2,$$

using H'=[1 0]. Under the assumption of independent Gaussian measurement errors $v_k$ with known variances $R_k$, minimization of (C.2) is identical to Maximum Likelihood estimation of $X_k$ and $Y_k$. This interpretation motivates the choice of the objective function (C.2). Thus minimization of J(.) reduces to simple line fitting, i.e. minimization with respect to the clock offset $X_k$ and frequency offset (slope) $Y_k$. These are found by solving the normal equation $$\begin{bmatrix} \sum_{k'=k-N+1}^{k} \frac{1}{R_{k'}} & -\sum_{k'=k-N+1}^{k} \frac{(t_k - t_{k'})}{R_{k'}} \\ -\sum_{k'=k-N+1}^{k} \frac{(t_k - t_{k'})}{R_{k'}} & \sum_{k'=k-N+1}^{k} \frac{(t_k - t_{k'})^2}{R_{k'}} \end{bmatrix} \begin{bmatrix} X_k \\ Y_k \end{bmatrix} = \quad (C.3)$$

$$\begin{bmatrix} \sum_{k'=k-N+1}^{k} \frac{z_{k'}}{R_{k'}} \\ -\sum_{k'=k-N+1}^{k} \frac{z_{k'}(t_k - t_{k'})}{R_{k'}} \end{bmatrix}.$$

For increasing horizons, i.e. N=k, the well-known Recursive Least Squares (RLS) algorithm would allow to recursively compute $X_k$, $Y_k$, but in terms of ever increasing factors $(t_k-t_1)$ which is however impractical.

For a moving horizon of constant size N, there are no recursive algorithms. The equation (C.3) must be set up and solved at each step. For constant update intervals T, i.e. $t_k$=kT, the elements in (C.3) can be computed by N-tap FIR filters: for example, the second element of the RHS of (C.3) is the output of an FIR filter with coefficients $f_i$=iT, i=0 . . . N−1, and input $-z_k/R_k$, and similarly for the other elements of (C.3).

According to a further aspect of the present invention, the clock offset $z_k=\theta_k$ is measured as a function of a transmission time measured between sending and receiving the timing measurement messages. This provides the advantage that a known method can be reused in the present application scenario and can be furthermore adapted towards the technical teaching of the present invention. Hence, legacy systems can easily be adapted.

According to a further aspect of the present invention, the client determines the at least one clock offset as a function of time stamps, each time stamp indicating a send or receive operation of the time delay measurement messages. This provides the advantage that relevant method steps are performed on the client side, which allows the client to actively perform the suggested method while the server only needs to respond to specific messages.

According to a further aspect of the present invention, the time stamps are based on a local free-running oscillator. This provides the advantage that the client time stamps, for instance time stamps $T_1$ and $T_4$ as described with reference to FIG. 2 are based on a local free-running oscillator driving a counter, such as a HW counter. Instead of applying a known closed-loop synchronization, the time stamps are based on a free-running time base, running in open loop. This will also be described in the specific embodiments.

According to a further aspect of the present invention, the step of weighting by measurement accuracy is performed by selecting the inverse measurement variance parameter as a weighting parameter. Furthermore the person skilled in the art recognizes that the step of weighting by the measurement accuracy may also be performed by selecting a measurement variance parameter as an inverse weighting parameter. This provides the advantage that according to the present invention, the specific network behaviour and parameters can be considered for adjusting the client clock.

According to a further aspect of the present invention, in case all sending and receiving operations are performed properly, a default value is provided for the variance parameter. This provides the advantage that the at least one offset can be weighted according to a determined parameter which can be specifically chosen for a specific network scenario.

According to a further aspect of the present invention, in case the sending or the receiving operation is failed, an infinite value is provided for the variance parameter. The infinite value refers to a value which is much larger than the default value. In the specific embodiment, much larger means that a specific factor is provided which can be multiplied with the default value for determining such a large value. For instance, instead of choosing an infinite value, a factor of 1000 can be chosen which is multiplied on the default value for the variance parameter.

According to a further aspect of the present invention, in case one determined clock offset differs from previously measured clock offsets by a specified extent, an infinite value is provided for the variance parameter. The person skilled in the art appreciates that the infinite value which is provided for the variance parameter can again be a value which is much larger than the default value, for instance by means of the definition of infinite as provided above.

According to a further aspect of the present invention, the time horizon is determined by at least one of a group of techniques, the group comprising a number of previous message exchanges and a determined time span. This provides the advantage that a specific time interval, for instance being specified by a number of seconds, can be considered for adjusting the client clock. Therefore, the time horizon can be specified by the last N timing message exchanges. Hence, it is possible to specify that a number of previous message exchanges or a specific time span is considered. This can also be referred to as an expiry time, as older measurements are not considered. One example for such a number N of the last timing message exchanges is a range between 10 and 1.000, namely 10<N<1000. "Moving Horizon" and "sliding window" refer to the "time horizon". Hence, this terminology can be used interchangeably.

According to a further aspect of the present invention, determining the timing offset considers asymmetric transmission times between the client and the server. This provides the advantage that the transmission time from the client to the server may differ from the transmission time from the server to the client. Again, it is noted that the client and server architecture can be enhanced towards a peer-to-peer architecture, which, again, may provide asymmetric transmission times. Hence, the network behaviour can be measured more precisely.

According to a further aspect of the present invention, one of a group of estimation techniques is applied, the group comprising a Moving Horizon Estimation and a line fitting over a sliding window technique. This provides the advantage that known expiry time techniques can be applied and enhanced towards the technical teaching of the present invention.

According to a further aspect of the present invention, the measurement accuracy is perceived as a function of at least one of a time stamping inaccuracy due to hardware and software delays in the clocks, a message loss in the communication network, and time-varying delays and delay asymmetries due to network load and congestion. This provides the advantage that a variety of error sources can be addressed.

The object is also solved by a system for synchronization of a client clock to a server clock over a network, comprising a determining unit being arranged to determine on the network at least one clock offset by exchanging time synchronization messages between the client and the server, wherein clock offsets are only considered within a provided time horizon. The system also comprises a weighting unit being arranged to weight the determined at least one clock offset by their measurement accuracy and furthermore comprises an adjustment unit being arranged to adjust the client clock as a function of the weighted clock offsets such that the client clock is synchronized to the server clock.

The problem is also solved by a client machine being arranged to perform a synchronization of a client clock to a server clock over a network, comprising a determining unit, a weighting unit, and an adjustment unit which are arranged according to those units as provided above.

The person skilled in the art appreciates that the system comprises a client and a server or respective peers and the suggested client can be operated independently of the server, which means that the client can perform the measurements, the weighting and the adjustment itself. Hence, the server machine only needs to send the timing messages back to the client machine.

Furthermore, a computer-readable medium containing program instructions for causing a computer to perform the provided method is suggested.

This invention gives a simple and robust method for network-based synchronization, with improved performance in the presence of measurement outliers as due to time-varying and lossy network connections. The method is derived in systematic way and is optimum in a well defined sense (as given by the objective functions (B.1) or (C.2)).

The only parameters to be selected for the algorithm are horizon length NT and outlier detection threshold $m\sigma_\theta$. They have intuitive interpretations and are thus simple to tune.

The invention improves synchronization performance even if the underlying time stamping method has low accuracy and the network connection is time-varying and lossy. This lowers the implementation cost of network-based synchronization, as it may allow software- (rather than hardware-) based time stamping and use of low cost lossy networks (rather than broadband deterministic) networks.

The moving horizon method used in the invention may require that a batch of N measurement points is stored in local memory before processing can start, in contrast to recursive filtering approaches where only the newest clock state needs to be stored and updated.

The time constant of the synchronization may be given by the horizon length, i.e. NT seconds. This affects in particular the synchronization response time when the client oscillator experiences fast changes in clock phase or frequency, e.g. due to vibration or temperature change. NT must be chosen as a compromise between high measurement accuracy and outlier detection reliability, requiring high NT, and low time lag of the control response, requiring low NT.

Note that synchronization accuracy and response time may depend also on the oscillator stability and the implementation of the "gearing" control between the free-running oscillator and synchronized clock at the client.

In the following, the invention will be described merely by way of illustration with reference to the accompanying Figures.

Figure 1A:
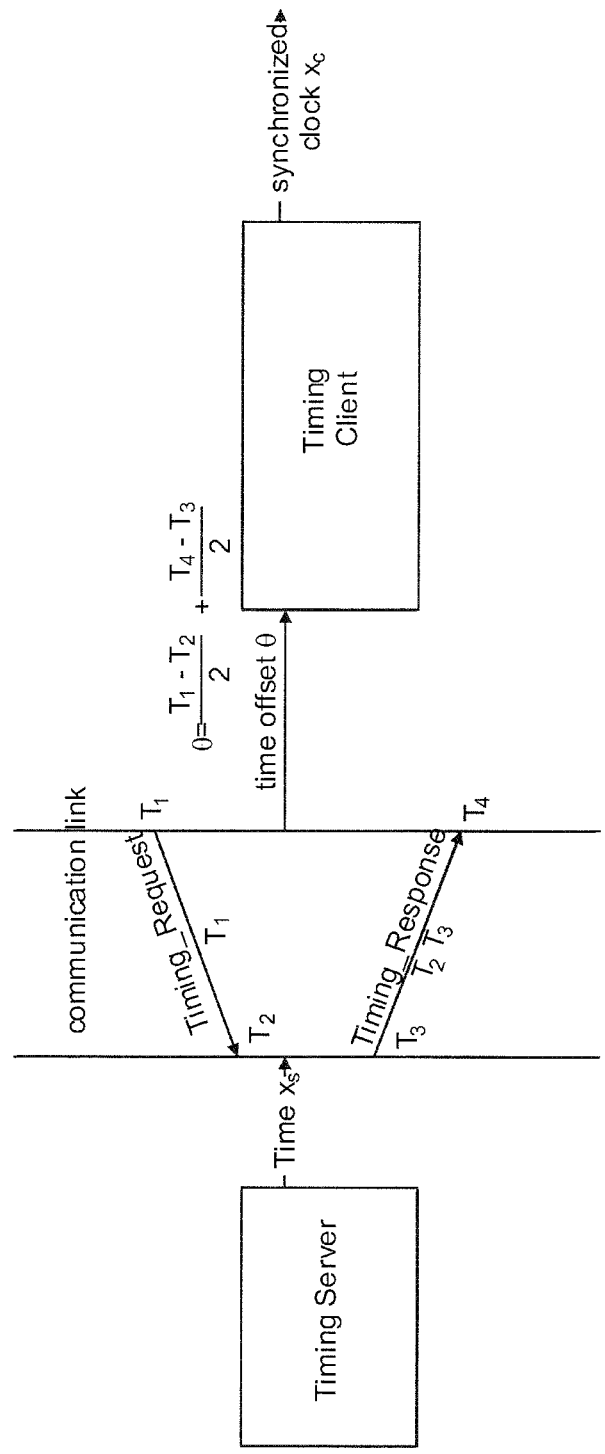
FIG. 1A shows a known synchronization method.
Figure 1B:
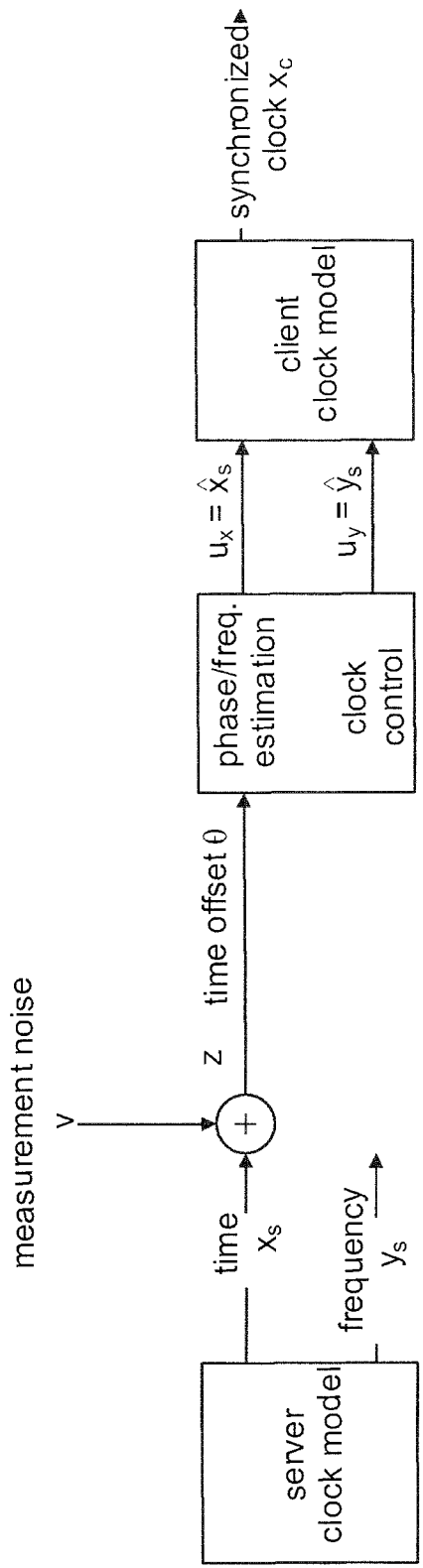
FIG. 1B shows a method for network-based synchronization of a client clock to a server clock according to an aspect of the present invention.

The invention improves the well-known network-based synchronization method shown in FIG. 1. One of the main novelties is to apply Moving Horizon Estimation (MHE) to perform optimum batch estimation of the clock phase and frequency offset. MHE allows to introduce explicit constraints in the estimation, in order to suppress the effect of measurement outliers on the estimates. It also allows to weight measurements, based on their perceived accuracy. Thus estimation of phase and frequency is improved in the presence of outliers. The estimates are used to control the client clock, which results in an improved synchronization performance.

The use of MHE or MHLF requires that the client time stamps ($T_1$ and $T_4$) are based on a free-running time base (oscillator), i.e. which runs in open loop. (This is in contrast to traditional closed-loop synchronization using PLLs and coupled oscillators [NTP], where time stamps are based on the synchronized clock which is controlled in closed loop fashion. This would affect subsequent $T_1$ and $T_4$ measurements within the estimation horizon, which is undesired). Thus the open loop architecture, shown in FIG. 2, is prerequisite and part of the invention.

The preferred embodiment uses a simplified form of MHE, here called Moving Horizon Line Fitting (MHLF). The client clock may be synchronized to the server clock using the following steps:

1. Raw measurements: At time $t_k$, the client clock initiates a timing message exchange with the server clock, using the well-known protocol with timing request and timing response. From the resulting time stamps stamps $T_1$ to $T_4$, the client clock calculates the instantaneous clock offset $\theta_k$, $$\theta_k = \frac{T_1 - T_2}{2} + \frac{T_4 - T_3}{2}. \quad (1)$$

Figure 2:
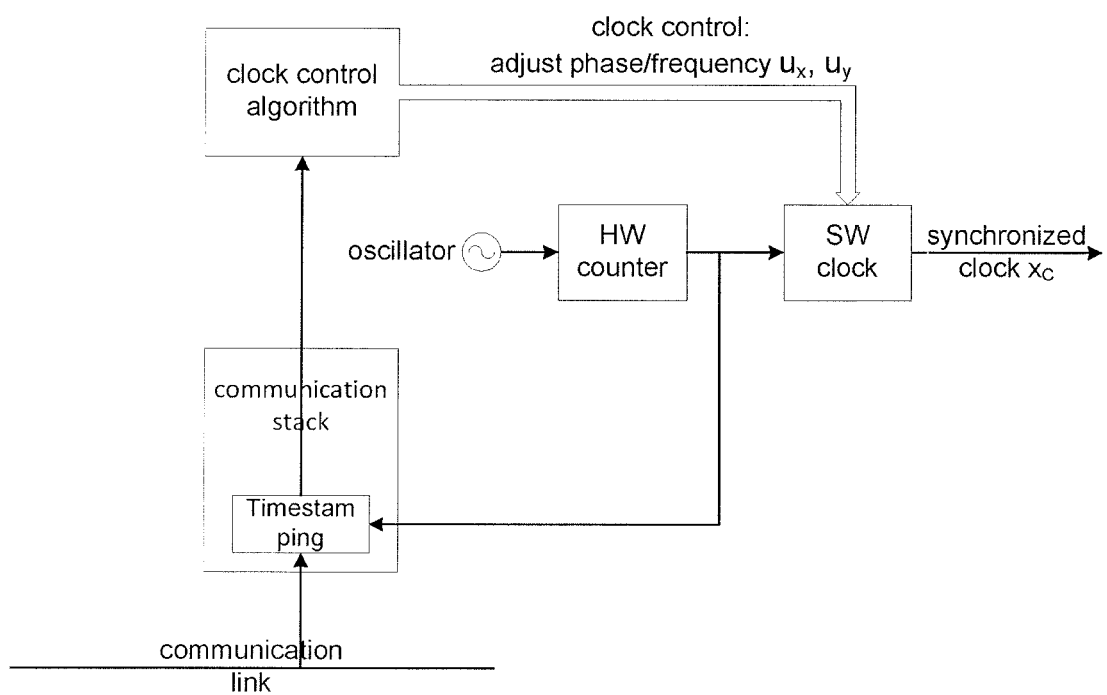
FIG. 2 shows a device being arranged to perform a network-based synchronization according to an aspect of the present invention.

According to the invention, the client time stamps ($T_1$ and $T_4$) are based on a local free-running oscillator driving a counter ("HW counter" in FIG. 2).

2. Measurement weighting and outlier detection: Measurements can be weighted according to their perceived accuracy, by selecting the "measurement variance" parameter $R_k$, to be used in (3) below. An example method is as follows: (i) If the message exchange was normal and successful, $R_k$ is set to some small default value $R_k=R$. (ii) If the message exchange failed, i.e. the transmission of the timing request or response messages was unsuccessful, $R_k$ is set to infinite, or to some large value such as $R_k=1000R$. (iii) Also, if the measurement is as an outlier, set $R_k=1000R$. A simple and robust method to detect outliers considers successive raw measurements:
If they differ by much more than expected, given the frequency offset, i.e. if $$|\theta_k - \theta_{k-1} - \hat{Y}_{k-1}(t_k - t_{k-1})| > m\sigma_\theta \quad (2),$$

then $\theta_k$ is classified as an outlier and its corresponding $R_k=1000R$. In (2), $\hat{Y}_{k-1}$ is the current estimate of the frequency offset, and $m\sigma_\theta$ is a suitably chosen threshold, see (B.15) in Aspect B.

3. Moving Horizon Line Fitting: The client collects the measurements $z_k=\theta_k$ over a moving horizon from $t_{k-N+1}$ to $t_k$, as obtained by the last N timing message exchanges. It sets up and solves the linear system of equations (3) to obtain the new estimates of clock phase $\hat{X}_k$ and frequency $\hat{Y}_k$, $$\begin{bmatrix} \sum_{k'=k-N+1}^{k} \frac{1}{R_{k'}} & -\sum_{k'=k-N+1}^{k} \frac{(t_k - t_{k'})}{R_{k'}} \\ -\sum_{k'=k-N+1}^{k} \frac{(t_k - t_{k'})}{R_{k'}} & \sum_{k'=k-N+1}^{k} \frac{(t_k - t_{k'})^2}{R_{k'}} \end{bmatrix} \begin{bmatrix} \hat{X}_k \\ \hat{Y}_k \end{bmatrix} = \quad (3)$$

$$\begin{bmatrix} \sum_{k'=k-N+1}^{k} \frac{z_{k'}}{R_{k'}} \\ -\sum_{k'=k-N+1}^{k} \frac{z_{k'}(t_k - t_{k'})}{R_{k'}} \end{bmatrix}.$$

The derivation of (3) is given in Aspect C. As seen, a high $R_k$ reduces the weight of the corresponding measurement $z_k = \theta_k$.

4. Clock control: $\hat{X}_k$ and $\hat{Y}_k$ are the estimate of the server clock phase and frequency, as computed by the client. In order to track the server clock, for client clock control takes these values as setpoints $u_x = \hat{X}_k$ and $u_y = \hat{Y}_k$. These setpoints are used to adjust the client clock, by adjusting the "gearing" between its free-running oscillator ("HW counter" in FIG. 2) and the synchronized clock ("SW clock" in FIG. 2). Methods are known and can be applied to ensure that the resulting time trajectory increases monotonously, even in the presence of possibly negative jumps in the clock phase setpoint $u_x = \hat{X}_k$.

As described above, MHLF forces the clock phase estimate to be an exact straight line within the measurement horizon, by assuming that the clock state differences $w_k \equiv 0$. With long horizons required in high noise environments, this may be too restrictive. Non-zero state differences should thus be allowed, but still constrained to some limits $|w_k| \leq q$, in order to suppress or mitigate the effect of outliers on the state estimates. This leads to a constrained estimation problem, implemented by Moving Horizon Estimation (MHE). Application of MHE to synchronization constitutes another embodiment of this invention; it is derived in Aspect B. At each step, a full Quadratic Programming (QP) problem must be set up and solved numerically, which requires much higher computations than the simple MHLF case of (3). However, QP convergence can be speeded up by orders of magnitude by taking the computed solution from the previous step as starting point for the QP iteration in the next step.

Over very long horizons, the mathematical clock model in (A.7) should not neglect the frequency drift and is thus three-dimensional. Conceptionally, it is straightforward to extend Kalman Filtering and MHE to this case. The frequency drift leads to a quadratic deterministic term in the clock offset, and MHLF becomes a Moving Horizon quadratic curve fitting. However, in practice these extensions and possible embodiments may not be relevant for most applications.

Figure 3:
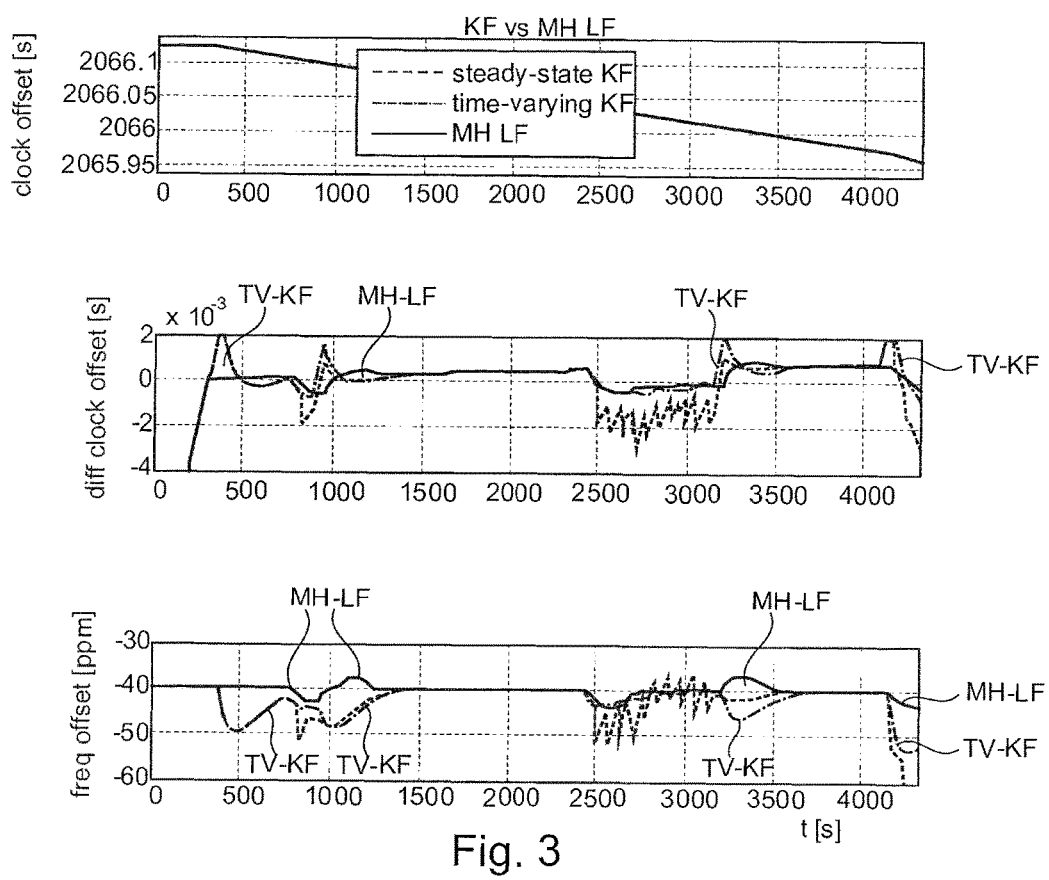
FIG. 3 shows simulation results of the method for network-based synchronization illustrating the improvements being achieved by applying the suggested invention.

In FIG. 3, estimation results of the suggested method according to the present invention are provided. Measurement results of a Steady-State Kalman Filter, a Time-Varying Kalman Filter as well as a Moving Horizon Line Fitting is provided. The Time-Varying Kalman Filter is denoted by reference sign TV-KF and the Moving Horizon Line Fitting is denoted by reference sign MH-LF.

FIG. 3 shows simulation results of clock estimation methods applied to measured data $\{\theta_k\}$, showing improvement by the Moving Horizon Line Fitting (MHLF) method of the invention over known Kalman Filter (KF) methods.

Measurement data $\{\theta_k\}$: measurement duration 4500 seconds, cycle time T=1 s. Server and client clocks were connected over Ethernet LAN (measured standard deviation $\sigma_\theta = 24.8$ μs), or wireless LAN (in intervals 700-800 s and 2400-3200 s, with much higher measured $\sigma_\theta$). FIG. 3 shows the following:

dashed curve: "steady-state KF" with constant Kalman gain $K_k$, no outlier detection TV-KF curve: "time-varying KF" with outlier detection, time-varying $K_k$, outlier detection threshold on innovation signal=$5 \cdot 10^{-3}$ s MH-LF curve: MHLF, horizon NT=300·1 s, outlier detection threshold $m\sigma_\theta = 2 \cdot 10^{-4}$ s. One example for a number N of the last timing message exchanges is a range between 10 and 1.000, namely 10<N<1000, preferably N=300.

top: clock phase $\{\theta_k\}$, and its estimates as KF output, and MHLF output center: clock phase estimates with overall slope removed, to show differences in clock estimation errors bottom: clock frequency estimates.

Note that the maximum estimation error in the presence of large outliers is smallest for MHLF.

Figure 4:
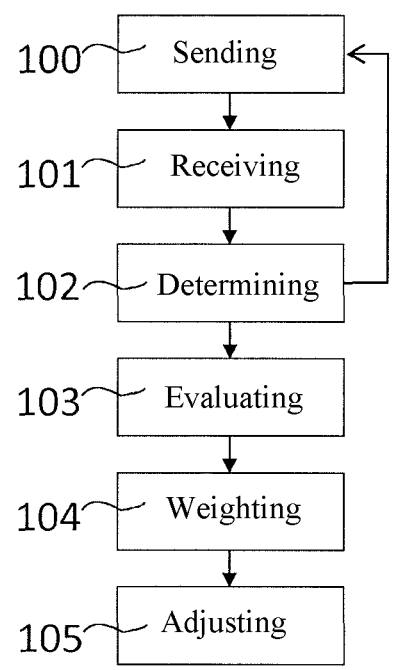
FIG. 4 shows an aspect of a method for network-based synchronization of a client clock to a server clock according to the present invention.

FIG. 4 shows an aspect of a method for network-based synchronization of a client clock to a server clock according to the present invention. In a first method step, a timing measurement message, also referred to as time synchronization message or synchronization message throughout the description, is sent from the client to the server 100. The sending operation as well as further receiving operations have one time stamp each which is assigned to the respective sending or receiving time. The sent message is received by the server 101. These method steps 100 and 101 may be performed repeatedly, for instance, several messages may be sent from the client to the server and several messages may be again sent from the server to the client, for instance according to a sending profile. Hence, it is possible to send messages according to a predefined time schedule. Each of the transmission times from client to server and server to client is determined and/or stored in a method step 102. In a further method step 103, it is evaluated whether the performed measurements are within the provided time horizon. Hence, message step 103 checks the respective time stamps and compares them with the provided time horizon. Only in case the measurements are within the time limit as being defined by the time horizon, the further method step 104 of weighting the measured clock offsets of step 102 is performed. After a weighting of the measured clock offsets is performed, the adjustment setpoints are calculated according to the described methods and the client clock can be adjusted and/or corrected accordingly in a further method step 105. The person skilled in the art appreciates that all of the method steps may be performed iteratively and/or in a different order wherever applicable.

Along with the suggested devices, systems, and modules, respective methods for their operation are provided as well as a computer-readable medium having stored thereon instructions executable by a computer processor, the instructions, which, when executed by the processor, perform the method of the aspects as set forth above.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for synchronization of a client clock to a server clock over a network, the method comprising:
   determining, within a provided time horizon, clock offsets by exchanging synchronization messages between the client and server clocks;
   weighting the clock offsets by their measurement accuracy to obtain a weighted clock offset; and
   adjusting the client clock as a function of the weighted clock offset such that the client clock is synchronized to the server clock,
   wherein the weighted clock offset includes an estimated clock phase and clock frequency,
   wherein the time horizon applies to one of a group of estimation techniques, the group comprising a Moving Horizon Estimation or line fitting over a sliding window technique,
   wherein the client clock determines the clock offsets as a function of time stamps, each time stamp indicating a send or receive operation of the synchronization messages, and
   wherein the time stamps are based on a local free-running oscillator.

2. The method according to claim 1, wherein the clock offsets are determined as a function of a transmission time measured between sending and receiving the synchronization messages.

3. The method according to claim 1, the weighting by the measurement accuracy is performed by selecting a measurement variance parameter as an inverse weighting parameter.

4. The method according to claim 3, wherein in case all sending and receiving operations are performed properly a default value is provided for the variance parameter.

5. The method according to claim 3, wherein in case the sending or the receiving operation is failed an infinite value is provided for the variance parameter.

6. The method according to claim 5, wherein in case one determined clock offset differs from previously determined clock offsets to a specified extend an infinite value is provided for the variance parameter.

7. The method according to claim 6, wherein the time horizon is determined by at least one of a group of techniques, the group comprising a number of previous message exchanges, preferably the last N messages, and a determined time span.

8. The method according to claim 7, wherein determining the clock offsets considers asymmetric transmission times between the client and server clocks.

9. The method according to claim 1, wherein in case the sending or the receiving operation is failed an infinite value is provided for a variance parameter.

10. The method according to claim 1, wherein in case one determined clock offset differs from previously determined clock offsets to a specified extend an infinite value is provided for a variance parameter.

11. The method according to claim 1, wherein the time horizon is determined by at least one of a group of techniques, the group comprising a number of previous message exchanges, preferably the last N messages, and a determined time span.

12. The method according to claim 1, wherein determining the clock offsets considers asymmetric transmission times between the client and server clocks.

13. The method according to claim 1, wherein the measurement accuracy is perceived as a function of at least one of a time stamping inaccuracy due to hardware and software delays in the clocks, a message loss in the network, and time-varying delays and delay asymmetries due to the network load and congestion.

14. A non-transitory computer-readable medium containing program instructions for causing a computer to perform the method of claim 1.

15. A system for synchronization of a client clock to a server clock over a network, the system comprising:
   a determining circuit being arranged to determine, within a provided time horizon, at least one clock offset by exchanging synchronization messages between the client and server clocks;
   a weighting circuit being arranged to weight the determined at least one clock offset by their measurement accuracy, in order to obtain a weighted clock offset including an estimated clock phase and clock frequency; and
   an adjustment circuit being arranged to adjust the client clock as a function of the weighted clock offset such that the client clock is synchronized to the server clock,
   wherein the time horizon applies to one of a group of estimation techniques, the group comprising a Moving Horizon Estimation or line fitting over a sliding window technique,
   wherein the client clock determines the at least one clock offset as a function of time stamps, each time stamp indicating a send or receive operation of the synchronization messages, and
   wherein the time stamps are based on a local free-running oscillator.

16. A client being arranged to perform a synchronization of a client clock to a server clock over a network, the client comprising:
   a determining circuit being arranged to determine, within a provided time horizon, at least one clock offset by exchanging synchronization messages between the client and server clocks;
   a weighting circuit being arranged to weight the determined clock offsets by their measurement accuracy, to obtain a weighted clock offset including an estimated clock phase and clock frequency; and
   an adjustment circuit being arranged to adjust the client clock as a function of the weighted clock offset such that the client clock is synchronized to the server clock,
   wherein the time horizon applies to one of a group of estimation techniques, the group comprising a Moving Horizon Estimation or line fitting over a sliding window technique,
   wherein the client clock determines the at least one clock offset as a function of time stamps, each time stamp indicating a send or receive operation of the synchronization messages, and
   wherein the time stamps are based on a local free-running oscillator.

* * * * *